United States Patent
Arhab et al.

(10) Patent No.: US 9,885,405 B2
(45) Date of Patent: Feb. 6, 2018

(54) STATOR ASSEMBLY OF HYDROKINETIC TORQUE CONVERTER WITH PRESS CRIMPED RETAINER PLATES AND METHOD FOR MAKING THE SAME

(71) Applicant: VALEO EMBRAYAGES, Amiens (FR)

(72) Inventors: Rabah Arhab, Saint-Brice-Sous-Foret (FR); Alfonso Medellin, Mision de Santiago (MX); GyuBong Jeon, Troy, MI (US)

(73) Assignee: Valeo Embrayages (FR)

( * ) Notice: Subject to any disclaimer, the term of this patent is extended or adjusted under 35 U.S.C. 154(b) by 745 days.

(21) Appl. No.: 14/286,226

(22) Filed: May 23, 2014

(65) Prior Publication Data
US 2015/0337933 A1 Nov. 26, 2015

(51) Int. Cl.
*F16H 41/24* (2006.01)
*F01D 9/04* (2006.01)
*F01D 25/16* (2006.01)
*B23P 15/00* (2006.01)

(52) U.S. Cl.
CPC ............ *F16H 41/24* (2013.01); *B23P 15/00* (2013.01); *F01D 9/041* (2013.01); *F01D 25/16* (2013.01); F05D 2220/30 (2013.01); F05D 2230/60 (2013.01); F16H 2041/246 (2013.01); Y10T 29/49325 (2015.01)

(58) Field of Classification Search
CPC .... F16H 41/24; F16H 2041/246; F01D 9/041; F01D 25/16; B23P 15/00; Y10T 29/49325; F05D 2220/30; F05D 2230/60
USPC ........................................................ 415/123
See application file for complete search history.

(56) References Cited

U.S. PATENT DOCUMENTS

| 6,907,971 B2 | 6/2005 | Demir et al. |
| 2007/0220875 A1* | 9/2007 | Akamatsu ............... F16D 41/07 60/345 |
| 2009/0205916 A1 | 8/2009 | Peri |

(Continued)

FOREIGN PATENT DOCUMENTS

| FR | 2800143 A1 * | 4/2001 | ............ F16H 41/24 |
| JP | 2005133731 A | 5/2005 | |

(Continued)

OTHER PUBLICATIONS

Ichinose, et al., JP 2011236991 (A), 2011, English translation, entire document.*
Corresponding EP Search Report for EP 15 16 5487.

*Primary Examiner* — Jason Shanske
*Assistant Examiner* — Jason T Newton
(74) *Attorney, Agent, or Firm* — Berenato & White, LLC

(57) ABSTRACT

A stator assembly of a hydrokinetic torque converter includes a stator rotatable about an axis and having a hub bore coaxial to the axis, the stator having a crimped portion, a one-way clutch mounted to the stator in the hub bore coaxially to the axis, and a retainer plate fixedly secured to the stator in hub bore by the crimped portion. A method for making a stator assembly of a hydrokinetic torque converter involves providing a stator having an axis and a hub bore that is coaxial with the axis, the hub bore containing a one-way clutch and an annular retainer plate, and crimping a portion of the stator to fixedly secure the one-way clutch and the annular retainer plate in the hub bore.

16 Claims, 6 Drawing Sheets

(56) References Cited

U.S. PATENT DOCUMENTS

| | | |
|---|---|---|
| 2012/0193182 A1 | 8/2012 | Gurney |
| 2013/0174538 A1 | 7/2013 | Takashima |
| 2015/0354683 A1* | 12/2015 | Nozawa .................. F16H 41/24 60/330 |

FOREIGN PATENT DOCUMENTS

| | | | |
|---|---|---|---|
| JP | 2005214312 A | * 8/2005 | |
| JP | 2009299860 A | 12/2009 | |
| JP | 2011236991 A | * 11/2011 | ............. F16H 41/24 |

* cited by examiner

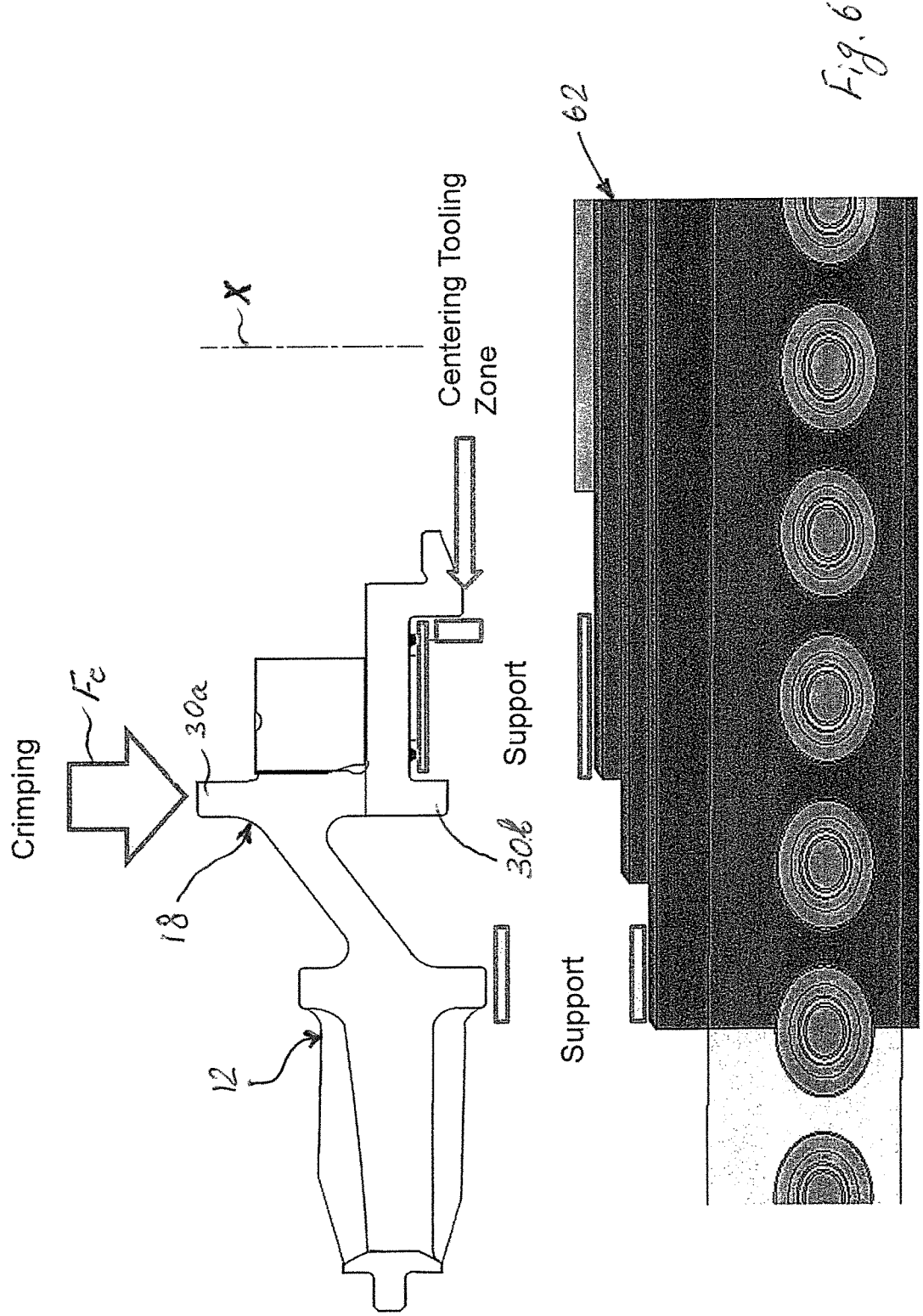

STATOR ASSEMBLY OF HYDROKINETIC TORQUE CONVERTER WITH PRESS CRIMPED RETAINER PLATES AND METHOD FOR MAKING THE SAME

BACKGROUND

This invention generally relates to hydrokinetic torque converters, including the arrangement of a stator and a one-way clutch in a hydrokinetic torque converter.

Typically, a hydrokinetic torque converter includes a drive pump (or impeller), a driven turbine, a stator (or reactor) fixed to a case of the torque converter, and a one-way clutch for restricting a rotational direction of the stator to one direction. The turbine is integral or operatively connected with a hub linked in rotation to a driven shaft, which is itself linked to an input shaft of a transmission of a vehicle. The turbine works together with the impeller, which is linked in rotation to a casing that is linked in rotation to a driving shaft driven by an internal combustion engine. The stator is interposed axially between the turbine and the impeller, and is mounted so as to rotate on the driven shaft with the interposition of the one-way clutch.

While hydrokinetic torque converters, including but not limited to that discussed above, have proven to be acceptable for vehicular driveline applications and conditions, improvements that may enhance their performance and cost are possible.

BRIEF SUMMARY OF THE INVENTION

According to a first aspect of the invention, there is provided a stator assembly for a hydrokinetic torque converter, the stator assembly including a stator rotatable about an axis and providing an annular hub bore coaxial to the axis, a one-way clutch mounted to the stator in the hub bore coaxially to the axis, and a retainer plate. The stator is crimped to fixedly secure the retainer plate and retain the one-way clutch in the hub bore.

According to a second aspect of the present invention, there is provided a method for making a stator assembly of a hydrokinetic torque converter. A stator is provided having an axis and a hub bore that is coaxial with the axis, the hub bore containing a one-way clutch and an annular retainer plate. A portion of the stator is crimped to fixedly secure the one-way clutch and the annular retainer plate in the hub bore.

The method involve the steps of providing a stator having an axis and an annular hub bore coaxial to the axis, mounting a one-way clutch in the hub bore of the stator, providing an annular retainer plate, inserting the annular retainer plate into the hub bore of the stator so that the one-way clutch is positioned in the hub bore between the stator and the retainer plate, and subsequently deforming the stator radially inwardly toward the retainer plate and thereby fixedly securing the annular retainer plate to the stator by a crimping operation so as to sandwich the one-way clutch between the stator and the annular retainer plate.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 6 illustrates a crimping process in accordance with the exemplary embodiment of the present invention.

Figure 1:
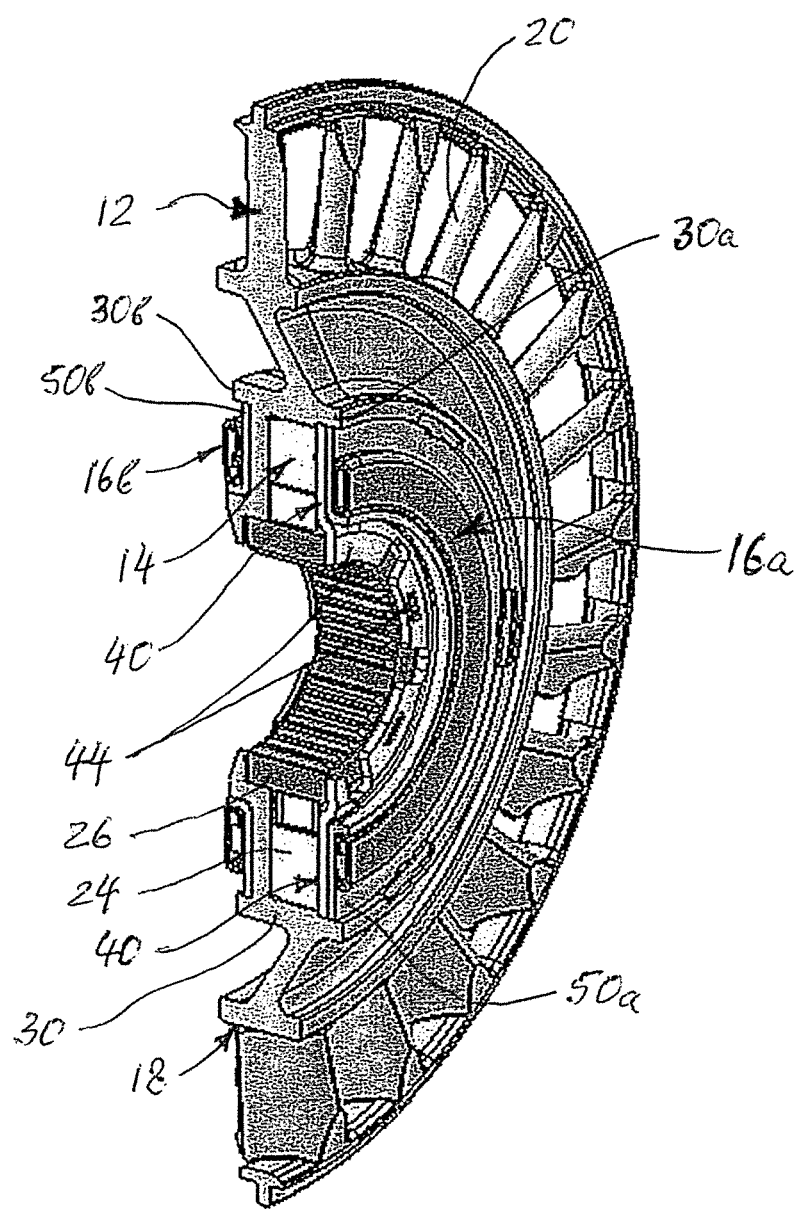
FIG. 1 is a fragmentary perspective view partially in cut-away of a stator assembly in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 2:
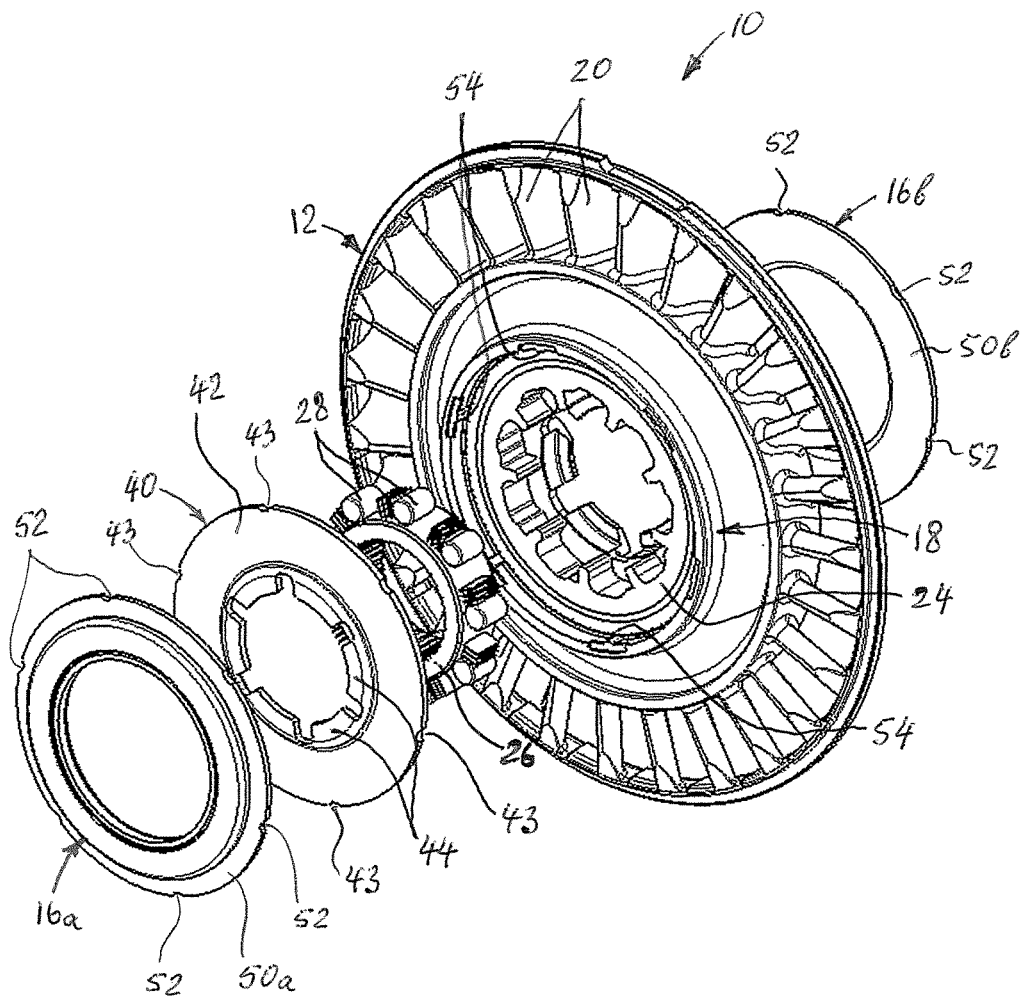
FIG. 2 is a partial exploded view of the stator assembly in accordance with the exemplary embodiment of the present invention.

A stator assembly suitable for use in a hydrokinetic torque converter is generally represented in the accompanying drawings by reference numeral 10, as best shown in FIG. 2. The stator assembly 10 is typically mounted between an impeller (not shown) and a turbine (not shown) of the torque converter.

The stator assembly 10 is rotatable about an axis X and comprises a stator (or reactor) 12, a one-way (or overrunning) clutch 14 disposed between the stator 12 and a stator shaft (not shown), a turbine (or first) thrust bearing 16a mounted between the stator 12 and a turbine (not shown) and provided at a radially inner portion of the turbine, and a pump (or second) thrust bearing 16b mounted between the stator 12 and an impeller (or pump) (not shown) and provided at a radially inner portion of the impeller. The one-way clutch 14 permits rotation of the stator 12 in one direction only. The turbine thrust bearing 16a and the pump thrust bearing 16b are provided to allow the relative rotation of the stator 12 with respect to the turbine and to the impeller. The turbine thrust bearing 16a and the pump thrust bearing 16b may be of any appropriate design, such as a needle bearing.

Figure 3:
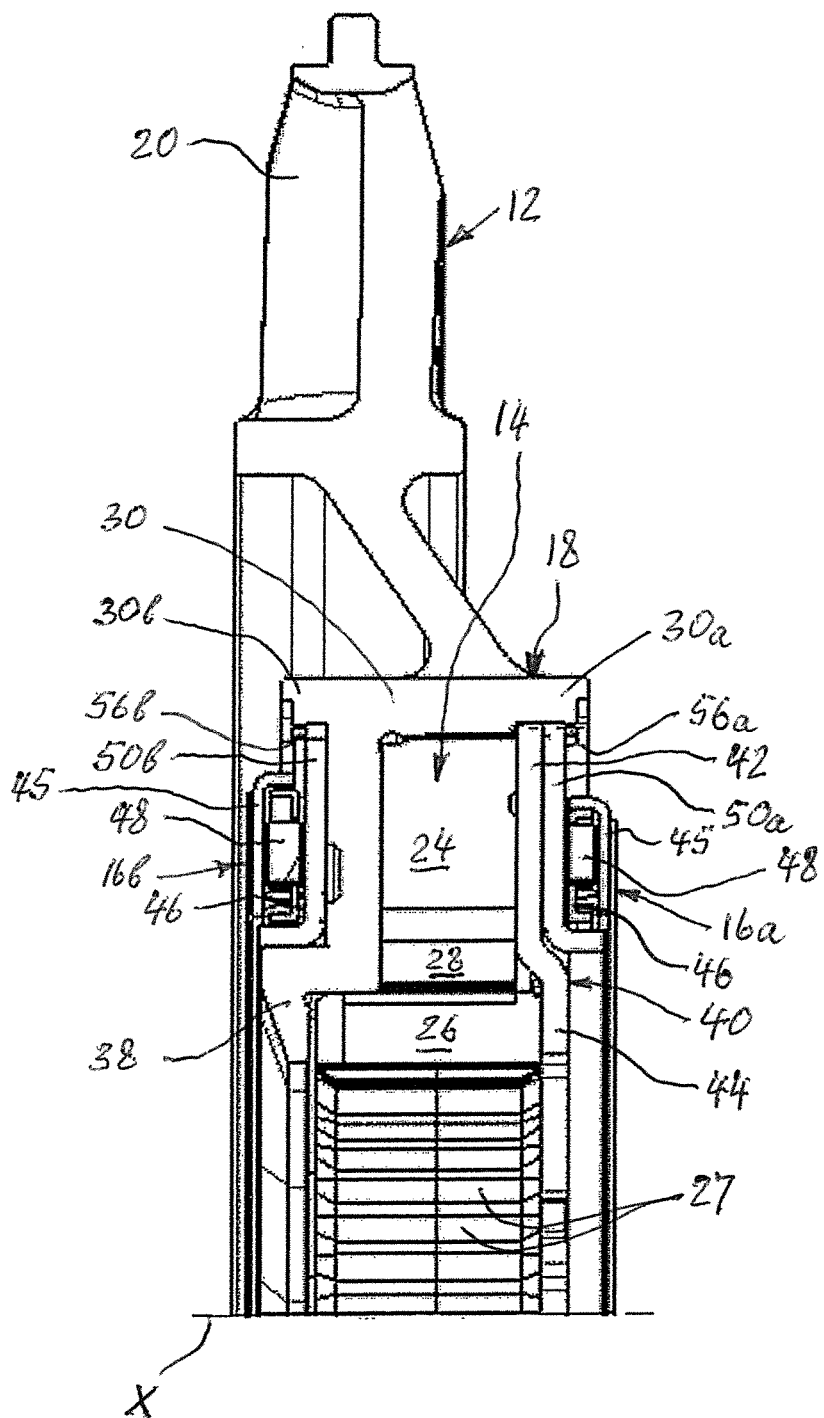
FIG. 3 is a fragmentary cross-sectional view of the stator assembly in accordance with the exemplary embodiment of the present invention.

The stator 12 is in the form of a cylindrical ring so as to define a stator hub 18 coaxial to the axis X, and a plurality of vanes 20 extending radially outwardly from the stator hub 18, which is located radially inward and central to the vanes 20. The first thrust bearing 16a is mounted operatively between the stator hub 18 and the turbine, while the second thrust bearing 16b is mounted operatively between the stator hub 18 and the impeller. As best shown in FIGS. 1 and 3, the first thrust bearing 16a and the second thrust bearings 16b are mounted on axially opposite sides of the stator hub 18.

Figure 4:
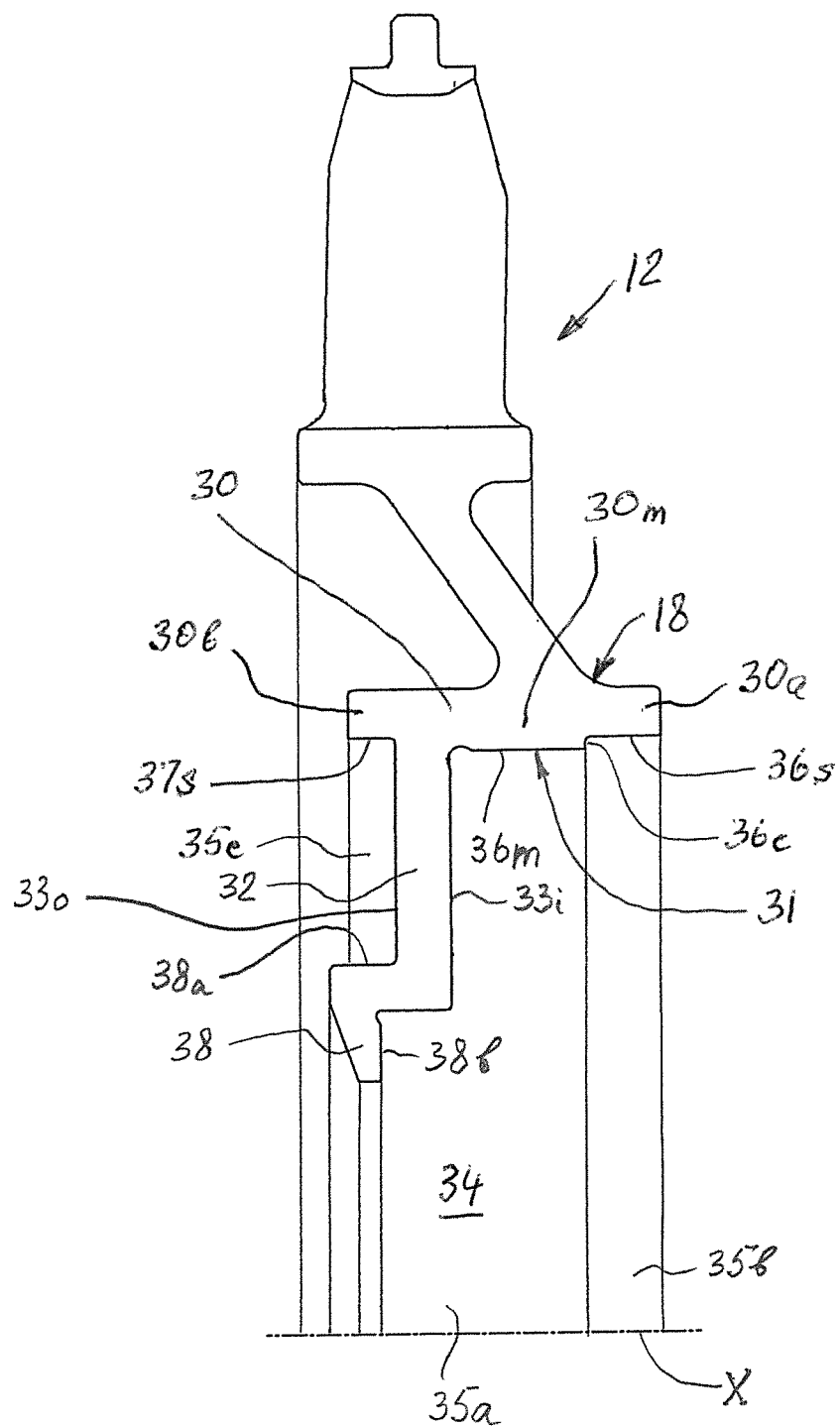
FIG. 4 is a fragmentary cross-sectional view of a stator in accordance with the exemplary embodiment of the present invention.

As best shown in FIG. 4, the stator hub 18 includes an annular base wall 30 coaxial to the axis X, and a transverse wall 32 extending radially inwardly from the base wall 30 so as to define an axial annular hub bore 34 coaxial to the axis X. The axial annular hub bore 34 within the stator hub 18 is delimited by a cylindrical inner peripheral surface 31 of the base wall 30 and an annular inner transverse surface 33i of the transverse wall 32. The cylindrical inner peripheral surface 31 of the base wall 30 extends substantially coaxially to the axis X, while both the inner transverse surface 33i and an annular outer transverse surface 33o of the transverse wall 32 extend substantially perpendicular to the axis X.

The base wall 30 of the stator hub 18 has a main portion 30m, a first axially distal end portion 30a, and a second axial distal end portion 30b. The first and second axially distal end portions 30a, 30b are defined at axially opposite distal ends of the stator hub 18. The transverse wall 32 is disposed adjacent to but spaced from the second axially distal end portion 30b of the base wall 30. The transverse wall 32 is closer to the second axially distal end portion 30b than to the first axially distal end portion 30a of the base wall 30. Alternatively, the transverse wall 32 may be disposed closer to the first axially distal end portion 30a of the base wall 30, or half-way between the first and second distal end portions 30a, 30b. The transverse wall 32 includes one or more support tabs 38 extending radially inwardly from the transverse wall 32.

The main portion 30m of the base wall 30 of the stator hub 18 includes a substantially cylindrical main inner surface 36m coaxial with the axis X. The first axially distal end portion 30a of the base wall 30 of the stator hub 18 includes a substantially annular, for example substantially cylindrical, end inner surface 36s coaxial with the axis X. The main inner surface 36m and the end inner surface 36s are joined by an annular contact surface 36c extending between the inner support surface 36s and the main inner surface 36m. The annular contact surface 36c is oriented substantially orthogonally relative to the axis X. The main inner surface 36m, the end inner surface 36s and the contact surface 36c collectively define the inner peripheral surface 31 of the hub bore 34.

The hub bore 34 within the stator hub 18 can be viewed as being divided into a cylindrical bearing central bore portion 35a delimited by the main inner surface 36m of the base wall 30 and the inner transverse surface 33i of the transverse wall 32, and a substantially annular end bore portion 35b arranged at the first axially distal end portion 30a of the base wall 30 and delimited by the inner support surface 36s and the annular contact surface 36c. A diameter of the cylindrical main inner surface 36m of the central bore portion 35a is less than a diameter of the annular inner support surface 36s of the end bore portion 35b of the first axially distal end portion 30b of the base wall 30 of the stator hub 18. The central bore portion 35a and the end bore portion 35b are adjacent to one another to collectively form the hub bore 34.

The one-way clutch 14 is disposed substantially in the cylindrical bearing central bore portion 35a (FIG. 4) of the hub bore 34 of the stator hub 18 coaxially to the axis X. The one-way clutch 14, as best shown in FIGS. 1 and 4, includes an outer ring 24 non-rotationally secured (e.g., fixed) to the stator hub 18 coaxially to the axis X, an inner ring 26 coaxial to the axis X, and a plurality of sprags or cylindrical rollers 28 circumferentially disposed in an annular space defined between the outer ring 24 and the inner ring 26. An inner peripheral surface of the inner ring 26 has splines 27 for rotatably coupling to an outer periphery of a stator shaft. The outer ring 24 is mounted within the hub bore 34 coaxially to the axis X so as to non-rotatably engage the main inner surface 36m of the bearing bore portion 35a of the base wall 30. The outer ring 24 can be toothed externally and force-fit into the main inner surface 36m of the bearing bore portion 35a so as to non-rotatably secure the outer ring 24 of the one-way clutch 14 to the stator hub 18 of the stator 12. The outer ring 24 abuts against the inner transverse surface 33i of the transverse wall 32 to axially position the outer ring 24 in the axial cylindrical bearing bore portion of the stator hub 18.

The stator assembly 10 includes a substantially annular retainer plate 40 mounted to the stator hub 18 adjacent to the first axially distal end portion 30a of the base wall 30 of the stator hub 18. The retainer plate 40 is provided to retain the one-way clutch 14 in the cylindrical hub bore 34 of the stator hub 18 and to prevent axial movement of the components of the one-way clutch 14 in the direction of the axis X relative to the stator hub 18. As best shown in FIGS. 1-3, the retainer plate 40 includes a substantially annular, planar retainer ring 42 and one or more retainer tabs 44 extending radially inwardly from the plate ring 42. An outer diameter of the retainer plate 40 is larger than the diameter of the cylindrical main inner surface 36m of the bearing bore portion 35a, but approximately equal to or slightly smaller than the diameter of the annular inner support surface 36s of the end bore portion 35b.

The stator retainer plate 40 has an axially inner end face engaging both the outer ring 24 and the inner ring 26 of the one-way clutch 14 so as to retain the sprags or cylindrical rollers 28 between the transverse wall 32 and the retainer plate 40 within the cylindrical bearing bore 34 of the stator hub 18. An axially outer end face of the stator retainer plate 40 engages the first thrust bearing 16a. The retainer plate 40 is secured at the first axially distal end portion 30a of the base wall 30 of the stator hub 18 by a press-crimping action in such a manner as to fixedly (i.e., non-movably) attach the retainer plate 40 to the stator 12. As best shown in FIG. 3, a crimped portion of the distal end portion 38a is represented by reference numeral 56a. Moreover, the retainer plate 40 is mounted to the first axially distal end portion 30a of the base wall 30 of the stator hub 18 so as to be disposed within the end bore portion 35b of the stator hub 18 delimited by the inner support surface 36s and the annular contact surface 36c, but outside the central bearing bore portion 35a.

As best illustrated in FIG. 4, the second axially distal end portion 30b of the base wall 30 of the stator hub 18 includes a substantially annular inner support surface 37s coaxial with the cylindrical peripheral surface 31 of the base wall 30. In the exemplary embodiment of the present invention, the annular outer transverse surface 33o of the transverse wall 32 is oriented substantially orthogonally relative to the axis X.

Each of the first and second thrust bearings 16a and 16b includes a pair of bearing races, specifically an outer (or first) bearing race 45 and an inner (or second) bearing race 46. A plurality of rollers 48 are rotatably positioned between the outer and inner bearing races 45, 46. The first and second thrust bearings 16a and 16b are mounted to bearing rings 50a and 50b, respectively, and are non-movably secured (i.e., fixed) to the stator hub 18. The first thrust bearing 16a and first bearing ring 50a may be substantially structurally and geometrically identical to the second thrust bearing 16b and the second bearing ring 50b, as shown. Alternatively, the first and second thrust bearings 16a, 16b and the bearing ring 50a, 50b thereof may be structurally and/or geometrically different from one another.

The first thrust bearing 16a is mounted to the first axially distal end portion 30a of the base wall 30 of the stator hub 18. Specifically, the first thrust bearing 16a is mounted to the retainer plate 40 disposed at the first axially distal end portion 30a of the base wall 30 of the stator hub 18 that faces the turbine. As best shown in FIG. 3, an outer diameter of the bearing ring 50a is larger than a diameter of the bearing bore portion 35a of the hub bore 34, but slightly smaller than the diameter of the end bore portion 35b of the hub bore 34, i.e., the diameter of the annular inner support surface 36s of the first axially distal end portion 30a. The bearing ring 50a is mounted to the first axially distal end portion 30a of the base wall 30 of the stator hub 18 so as to be disposed within the end bore portion 35b of the hub bore 34 delimited by the inner support surface 36s and the annular contact surface 36c, but outside the central bearing bore portion 35a of the hub bore 34. In the assembled condition of the stator assembly 10, the retainer plate 40 is disposed between the one-way clutch 14 and the bearing ring 50a. The crimped portion 56a retains the bearing ring 50a in place.

The bearing ring 50b of the second thrust bearing 16b is mounted to the second axially distal end portion 30b of the base wall 30 so as to axially engage the outer transverse surface 33o (FIG. 4) of the transverse wall 32, and radially engage a bearing support surface 38b of the support tabs 38 of the transverse wall 32. Thus, the stator hub 18 of the stator 12 defines a thrust bearing-receiving recessed section 35c delimited by the inner support surface 37s, the outer transverse surface 33o of the transverse wall 32, and the bearing support surface 38b for receiving the second thrust bearing 16b. The second axially distal end portion 30b of the base wall 30 of the stator hub 18 is deformed radially inwardly toward the bearing ring 50b thereby securing the bearing ring 50b of the second thrust bearing 16b to the stator 12. A press-crimping operation may be used to deform the second axially distal end portion 30b. The deformed, crimped portion is represented in FIG. 3 by reference numeral 56b. As a result, the inner support surface 37s of the second axially distal end portion 30b of the base wall 30 of the stator hub 18 fixedly (i.e., non-movably) engages a cylindrical outer peripheral surface of the bearing ring 50b of the second thrust bearing 16b.

As best illustrated in FIG. 2, the bearing ring 50a of the first thrust bearing 16a includes one or more indentations (or grooves) 52 formed at a peripheral edge of the bearing ring 50a, while the retainer plate 40 includes one or more indentations (or grooves) 43 formed at a peripheral edge of the planar retainer ring 42 of the retainer plate 40. The number and circumferential positions of the indentations 43 of the retainer plate 40 are the same as the indentations 52 of the bearing ring 50a. As illustrated, the retainer plate 40 and the bearing ring 50a each include six (6) indentations 43 and 52. The indentations 43 of the retainer plate 4 and the indentations 52 of the bearing ring 50a are substantially geometrically identical in the direction perpendicular to the axis X.

The first axially distal end portion 30a of the base wall 30 of the stator hub 18 includes one or more protrusions 54 extending radially inwardly and complementary to the indentations 43 of the retainer plate 40 and the indentations 52 of the bearing ring 50a. In the illustrated embodiment, the number of the protrusions 54 of the stator hub 18 equals to the number of the indentations 43 and 52 of the retainer plate 40 and the bearing ring 50a. According to the exemplary embodiment of the present invention, the stator hub 18 includes six (6) protrusions 54.

The indentations 43 and 52 of the retainer plate 40 and the bearing ring 50a, respectively, and the protrusions 54 of the stator hub 18 define an anti-rotation mechanism that prevents the rotation of the retainer plate 40 and the bearing ring 50a relative to the stator hub 18. The anti-rotation mechanism may undertake alternative forms. For example, the protrusion or protrusions may be provided on the retainer plate 40 and the bearing ring 50, while the indentation or indentations may be provided in the first axially distal end portion 30a of the base wall 30 of the stator hub 18, wherein the indentation(s) and protrusion(s) are complementary to one another.

Described below is an exemplary method whereby the stator assembly 10 of a hydrokinetic torque converter according to the exemplary embodiment of the present invention is assembled. It should be understood that alternative methods may be practiced within the scope of the invention.

According to an embodied method, the stator 12 is machined to form a single-piece part defining the hub bore 34 and having an axis X. The one-way clutch 14 is mounted to the stator 12 in the bearing bore portion 35a of the hub bore 34. The one-way clutch 14 may be mounted as follows. The outer ring 24 of the one-way clutch 14 is axially inserted into the bearing bore portion 35a until the outer ring 24 axially engages the inner transverse surface 33i of the transverse wall 32. A press fitting operation may be used to insert the outer ring 24 into the cylindrical main inner surface 36m of the base wall 30 so as to non-rotatably secure the outer ring 24 of the one-way clutch 14 to the stator hub 18 of the stator 12. The inner ring 26 of the one-way clutch 14 is axially inserted into the stator hub 18 until the inner ring 26 axially engages a clutch support surface 38b of the support tabs 38 of the transverse wall 32. The sprags or cylindrical rollers 28 are circumferentially placed in the annular space defined between the outer ring 24 and the inner ring 26. The elements 24, 26, and 28 may be inserted into the hub bore 34 in any order or simultaneously.

The annular retainer plate 40, which may be made by metal stamping, is mounted to the stator hub 18 of the stator 12 by inserting the annular retainer plate 40 into the end bore portion 35b of the stator hub 18 until the annular retainer plate 40 axially engages at least one of the outer ring 24 of the one-way clutch 14, the inner ring 26 of the one-way clutch 14, and/or the contact surface 36c of the first axially distal end portion 30a of the base wall 30 of the stator hub 18. The annular retainer plate 40 is thereby disposed within the end bore portion 35b, but outside the bearing bore portion 35a, while the one-way clutch 14 is positioned within the hub bore 34 between the transverse wall 32 of the stator hub 18 and the annular retainer plate 40. While or immediately after the retainer plate 40 is inserted into the end bore portion 35b in the stator hub 18, the retainer plate 40 is oriented so that the indentations 43 in the retainer plate 40 engage the protrusions 54 on the first axially distal end portion 30a of the base wall 30 of the stator hub 18.

The first thrust bearing 16a is mounted to the stator hub 18 of the stator 12 by inserting the bearing ring 50a into the end bore portion 35b of the stator hub 18 until the bearing ring 50a axially engages the annular retainer plate 40. The bearing ring 50a is also disposed within the end bore portion 35b of the hub bore 34, but outside the bearing bore portion 35a. While or immediately after the bearing ring 50a is inserted into the end bore portion 35b in the stator hub 18, the bearing ring 50a is oriented so that the indentations 52 in the bearing ring 50a engage the protrusions 54 on the first axially distal end portion 30a of the base wall 30 of the stator hub 18.

The second thrust bearing 16b is mounted to the stator hub 18 of the stator 12 by inserting the bearing ring 50b thereof into the thrust bearing receiving recessed section 35c in the stator hub 18 until the bearing ring 50b axially engages the traverse wall 32 of the stator hub 18.

Figure 5:
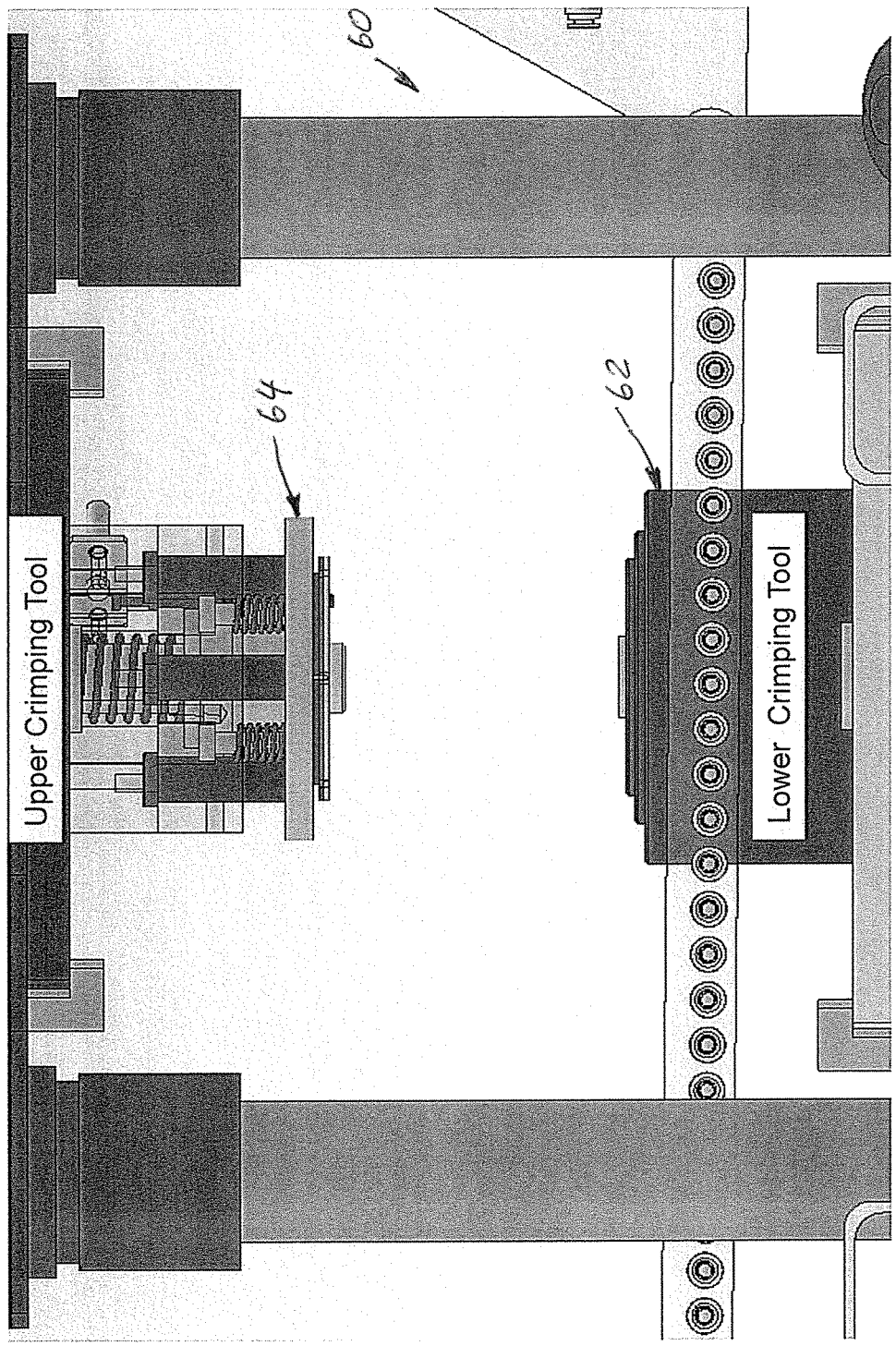
FIG. 5 is a front view of a crimping press.

Next, the first axially distal end portion 30a of the base wall 30 of the stator hub 18 is deformed radially inwardly toward the retainer plate 40 and the bearing ring 50a by a crimping operation to form the crimped portion 56a. The retainer plate 40 and the bearing ring 50a are thereby non-rotatably and axially non-movable secured to the stator 12, with the one-way clutch 14 sandwiched between the transverse wall 32 of the stator 12 and the annular retainer plate 40. The press-crimping operation may be performed simultaneously using a circular crimping press 60 (shown in FIG. 5). The crimping press 60 includes a lower circular crimping tool 62 and an upper circular crimping tool 64 with the crimping tools 62 and 64 movable relative to each other. During the crimping operation, first, the stator 12, with the one-way clutch 14, the retainer plate 40, and the first and second thrust bearings 16a and 16b mounted thereon, is placed and centered on the lower crimping tool 62. The stator 12 is disposed on the lower crimping tool 62 coaxially therewith. Then, the crimping press 60 is activated and the upper crimping tool 64 moves toward the lower crimping tool 62 and the stator 12. In other words, the upper crimping tool 64 moves axially toward the stator 12 in the direction substantially parallel to the axis X. Upon engagement with the stator 12, the upper crimping tool 64 contacts an outer peripheral surface or sections of the first axially distal end portion 30a of the base wall 30 of the stator hub 18 as illustrated in FIG. 6. By further moving the upper crimping tool 64 axially inwardly relative to the stator 12, the crimping force Fc is applied by the upper crimping tool 64 to the first axially distal end portion 30a of the base wall 30 of the stator hub 18, as shown in FIG. 6. As a result, the annular end inner surface 36s of the first axially distal end portion 30a of the base wall 30 of the stator hub 18 is deformed radially inwardly toward the retainer plate 40 and the bearing ring 50a so as to fixedly (i.e., non-movably) engage a cylindrical outer peripheral surface of the retainer plate 40 and a cylindrical outer peripheral surface of the bearing ring 50a of the first thrust bearing 16a.

Similarly, as the crimping force Fc is applied to the first axially distal end portion 30a of the base wall 30 of the stator hub 18 by pressing the upper crimping tool 64 against the stator 12, the second axially distal end portion 30b of the base wall 30 of the stator hub 18, an outer peripheral surface of which is in contact with the lower crimping tool 62, is also deformed radially inwardly toward the bearing ring 50b thereby non-rotatably and axially non-movable securing (i.e., fixing) the bearing ring 50b of the second thrust bearing 16b to the stator 12 by a press-crimping action to form crimped portion 56b. As a result, the inner support surface 37s of the second axially distal end portion 30b of the base wall 30 of the stator hub 18 fixedly (i.e., non-movably) engages a cylindrical outer peripheral surface of the bearing ring 50b of the second thrust bearing 16b.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:
1. A stator assembly of a hydrokinetic torque converter, comprising:
a stator rotatable about an axis, the stator comprising a stator hub having a hub bore defined in the stator hub and coaxial to the axis, the stator hub comprising a cylindrical axially extending base wall and a perpendicular transverse wall extending radially inwardly from the base wall to define the hub bore, the stator having a crimped portion;
a one-way clutch mounted to the stator in the hub bore coaxially to the axis adjacent the perpendicular transverse wall;
a retainer plate fixedly secured to the stator in the hub bore by the crimped portion; and
a first thrust bearing and a second thrust bearing mounted to axially opposite end portions of the stator on opposite sides of the one-way clutch, the first thrust bearing being fixedly secured to the stator in the hub bore by the crimped portion.

2. The stator assembly as defined in claim 1, wherein the stator further comprises a plurality of vanes extending radially outwardly from the stator hub.

3. The stator assembly as defined in claim 1, wherein the base wall of the stator hub has a main portion, a first axially distal end portion and a second distal end portion defined at axially opposite distal ends of the stator hub, wherein the transverse wall is disposed adjacent to the second axially distal end portion of the base wall, and wherein at least one of the first and second distal end portion comprises the crimped portion.

4. The stator assembly as defined in claim 3, wherein the hub bore within the stator hub includes a substantially cylindrical bearing central bore portion delimited by a main inner surface of the main portion of the base wall and an inner transverse surface of the wall, and an annular end bore portion arranged in the first axially distal end portion of the stator hub and delimited by an inner support surface of the first axially distal end portion.

5. The stator assembly as defined in claim 1, further comprising an anti-rotation mechanism preventing rotation of the retainer plate relative to the stator, wherein the anti-rotation mechanism comprises an indentation in one of the retainer plate and the stator, and a protrusion on the other of the retainer plate and the stator, wherein the protrusion is received by the indentation.

6. A stator assembly of a hydrokinetic torque converter, comprising:
  a stator rotatable about an axis and having a stator hub including a hub bore coaxial to the axis, the stator hub comprises a cylindrical base wall and a perpendicular transverse wall extending radially inwardly from the base wall to define the hub bore, the stator having a crimped portion;
  a one-way clutch mounted to the stator in the hub bore adjacent the perpendicular transverse wall and coaxially to the axis; and
  a thrust bearing fixedly secured to the stator in the hub bore by the crimped portion.

7. The stator assembly of claim 6, further comprising a retainer plate fixedly secured to the stator in the hub bore by the crimped portion.

8. The stator assembly of claim 7, wherein the thrust bearing comprises a first thrust bearing, and wherein the stator assembly further comprises a second thrust bearing mounted on an opposite side of the one-way clutch relative to the first thrust bearing.

9. The stator assembly of claim 8, wherein the crimped portion is a first crimped portion, and wherein the stator further comprises a second crimped portion fixedly securing the second thrust bearing to the stator.

10. The stator assembly of claim 9, wherein the first and second crimped portions respectively comprise first and second axial distal end portions of the stator.

11. A method for making a stator assembly of a hydrokinetic torque converter, the method comprising:
  providing a stator having an axis, the stator comprising a stator hub and a hub bore coaxial with the axis, the stator hub further comprising a cylindrical base wall and a perpendicular transverse wall extending radially inwardly from the cylindrical base wall to define the hub bore, the hub bore containing a one-way clutch, positioned adjacent the perpendicular transverse wall, and an annular retainer plate;
  providing a first thrust bearing; and
  crimping a portion of the stator to form a first crimped portion fixedly securing the first thrust bearing, the one-way clutch and the annular retainer plate in the hub bore.

12. The method of claim 11, further comprising providing a second thrust bearing, and applying a crimping operation to form a second crimped portion that fixedly secures the second thrust bearing to the stator axially opposite the first thrust bearing.

13. The method of claim 12, wherein the first and second thrust bearings are mounted to axially opposite end portions of the stator.

14. The method of claim 12, wherein the first and second crimped portions respectively comprise first and second axially distal end portions of the stator.

15. The method of claim 11, wherein the stator further comprises a plurality of vanes extending radially outwardly from the stator hub, wherein the hub bore is defined within the stator hub.

16. The method of claim 15, wherein the base wall of the stator hub has a main portion, a first axially distal end portion and a second axially distal end portion, the first and second axially distal end portions being at opposite distal ends of the stator hub, wherein the first and second axially distal end portions are crimped.

* * * * *